United States Patent [19]

Min et al.

[11] Patent Number: 5,102,218
[45] Date of Patent: Apr. 7, 1992

[54] TARGET-AEROSOL DISCRIMINATION BY MEANS OF DIGITAL SIGNAL PROCESSING

[75] Inventors: Kwang S. Min; Hisook L. Min, both of Fort Walton Beach, Fla.

[73] Assignee: The United States of America as represented by the Secretary of the Air Force, Washington, D.C.

[21] Appl. No.: 746,690

[22] Filed: Aug. 15, 1991

[51] Int. Cl.$^5$ .............................................. G01C 3/08
[52] U.S. Cl. ...................................................... 356/5
[58] Field of Search ........................ 356/5, 28.5, 342; 358/95

[56] References Cited

U.S. PATENT DOCUMENTS

| | | | |
|---|---|---|---|
| 4,397,549 | 8/1983 | Morgan | 356/5 |
| 4,742,353 | 5/1988 | D'Addio et al. | 342/159 |
| 4,881,077 | 11/1989 | Jehle et al. | 342/26 |
| 4,884,440 | 12/1989 | Berthel | 73/170 R |
| 4,920,412 | 4/1990 | Gerdt et al. | 358/95 |
| 4,937,583 | 6/1990 | Poinsard | 342/195 |

Primary Examiner—Mark Hellner
Attorney, Agent, or Firm—Bernard E. Franz; Donald J. Singer

[57] ABSTRACT

For all-weather active optical proximity sensors, the technique extracts a proper target signal from the mixture of target and aerosol returns. A waveform extraction method and a spectral extraction technique are used. The waveform extraction method examines the changes of the mixed signals in the time domain by using derivatives and other pertinent parameters. The spectral extraction method extracts the target signature by bandpass filtering the transform coefficients after taking orthogonal transformations of the mixed data. Using the former, a portion of a data set is segmented to include target and aerosol returns only. The latter method is applied to the segmented portion.

An outline of the method is stated in the following.
(1) Smooth the data distribution curve.
(2) Using the waveform extraction technique, identify the critical interval which may represent the target return signal, if any.
(3) Segment the neighborhood which includes the critical interval and the aerosol return signal, if any.
(4) Find transform coefficients for the segmented interval.
(5) Apply appropriate bandpass filtering to the transform coefficients.
(6) Reconstruct a signal using the filtered transform coefficients.

6 Claims, 8 Drawing Sheets

Data : b : 3801s312.z44
Scale Factor = 0.6

Only aerosol return signal found.

Data : b : 3801s31Z.c10
Scale Factor = 0.6

Neither target nor aerosol signal found.

TARGET-AEROSOL DISCRIMINATION BY MEANS OF DIGITAL SIGNAL PROCESSING

RIGHTS OF THE GOVERNMENT

The invention described herein may be manufactured and used by or for the Government of the United States for all governmental purposes without the payment of any royalty.

BACKGROUND OF THE INVENTION

The present invention relates generally to target-aerosal discrimination by means of digital signal processing, in Particular for optical (laser) proximity sensors at short range.

Active optical proximity sensors are considered to be advantageous over radio frequency counterparts for proximity fuzing in terms of its range and azimuthal resolution, and susceptibility to countermeasures. However, the presence of dense clouds, fog, or snow will create false signals and will obscure proper detection of the target. Efforts to develop a robust all-weather optical sensor have not been successful heretofore.

Patents of interest include U.S. Pat. No. 4,397,549, to Morgan, which teaches a method of the removal of LIDAR background backscattering by subtraction of multiple-delayed return signals. U.S. Pat. No. 4,742,353 to D'Addio et al teaches a digital processor for radar signals that suppresses clutter and enhances the target signal in a Doppler system. U.S. Pat. No. 4,881,077 to Jehle et al teaches a radar system which avoids rain echoes by employing a circularly polarized antenna. U.S. Pat. No. 4,884,440 teaches a method for eliminating noise from a data stream by measuring the noise and retrieving the part of the data stream uncontaminated by the noise. U.S. Pat. No. 4,937,583 to Poinsard teaches a method of filtering the carrier frequency, $f_0$, to obtain filtered frequencies $f_1$ and $f_2$ which are used to provide range and velocity data.

SUMMARY OF THE INVENTION

An objective of the invention, relating to the goal of developing all-weather active optical proximity sensors, is to provide a method which extracts a proper target signal from the mixture of target and aerosol returns, and to validate the method against real data.

The method according to the invention for discrimination of a target return from an aerosol signal employs the waveform extraction method and the spectral extraction technique. The waveform extraction method examines the changes of the mixed signals in the time domain by using derivatives and other pertinent parameters. The spectral extraction method extracts the target signature by bandpass filtering the transform coefficients after taking orthogonal transformations of the mixed data. Using the former, a portion of a data set is segmented to include target and aerosol returns only. The latter method is applied to the segmented portion. An outline of the method is stated in the following.

(1) Smooth the data distribution curve.
(2) Using the waveform extraction technique, identify the critical interval which may represent the target return signal, if any.
(3) Segment the neighborhood which includes the critical interval and the aerosol return signal, if any.
(4) Find transform coefficients for the segmented interval.
(5) Apply appropriate bandpass filtering to the transform coefficients.
(6) Reconstruct a signal using the filtered transform coefficients.

Target discrimination from aerosol can be achieved by steps 1 and 2, which use the waveform extraction technique. However, the discrimination is reinforced by the spectral extraction technique used in steps 3 through 6.

Features of the invention include:

1. The interval which represents the possible target return is identified using three parameters: the derivative and the second order derivative of the data distribution curve and the width of the interval.
2. The threshold values of the parameters, the derivative and the second order derivatives, are adapted to the severity of aerosol conditions.
3. Prior to the application of the spectral extraction method the interval is segmented so as to include aerosol and possible target returns only.
4. The trapezoidal filter which is used to bandpass the transform coefficients of the target signal is formulated to be adaptive to any size of a segmented interval.
5. The new enhancement process is applied to the reconstructed target signal.
6. The algorithm is tested for all (40 sets) real experimental data sets available at MNF/AFATL.

DETAILED DESCRIPTION

The invention is disclosed in a report AFATL-TR-90-50 by H. Min, K. Min and R. Orgusaar titled "Digital Processing Techniques for Active Optical Sensors"; and in a paper by H. Min, R. Orgusaar and K. Min titled "Digital Techniques for Target-Aerosol Discrimination in Active Sensors", to be published in Proceedings of XIVth Smoke/Obscurant Symposium, April 1990. Earlier work on the waveform extraction method and the spectral extraction method appears in a report AFATL-TR-88-137 by K. Min and H. Min titled "Target Aerosol Discrimination Techniques for Active Optical Proximity Sensors". The two reports and the paper are included herewith as appendices and are hereby incorporated by reference.

Figure 1:
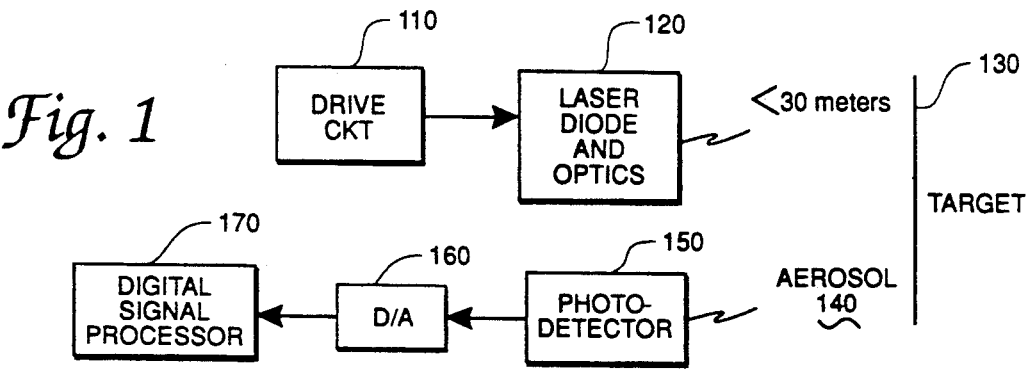
FIG. 1 is a block diagram of a system using active optical sensors for proximity fuzing.

FIG. 1 is a block diagram of a system using active optical sensors for proximity fuzing. A system used for collection of data is shown in the report AFATL-TR-89-73 by Robert H. Orgusaar titled "Optical Fuzing Sensor Data Collection", DTIC No. AD-B137 536, a copy of which is attached hereto as an appendix and incorporated by reference.

The transmitter comprises a transistor drive circuit 110 and a laser diode and optics 120. The target 130 is located at a short range of less than 30 meters, with 15.2 meters used in the data collection. The space between the proximity sensor and the target may be an aerosol 140 or clear air. In collecting data, the visibility varied from unlimited down to 4.5 m. The receiver unit 150 comprises a co-aligned fiber optic receiver coupled to a silicon avalanche photodetector. A digital-to-analog converter 160 couples the receiver unit 150 to a digital processor 170.

The signal processor 170 may be a VLSI board, with for example a 32-bit floating point high speed DSP chip, TMS320C30, programmed with a C-compiler. A flow chart for a program is shown in FIG. 2.

The method used in this work for discrimination of a target return from an aerosol signal employs the waveform extraction method and the spectral extraction technique. The waveform extraction method examines the changes of the mixed signals in the time domain by using derivatives and other pertinent parameters. The spectral extraction method extracts the target signature by bandpass filtering the transform coefficients after taking orthogonal transformations of the mixed data. Using the former, a portion of a data set is segmented to include target and aerosol returns only. The latter method is applied to the segmented portion.

An outline of the method is stated in the following.

Figure 2:
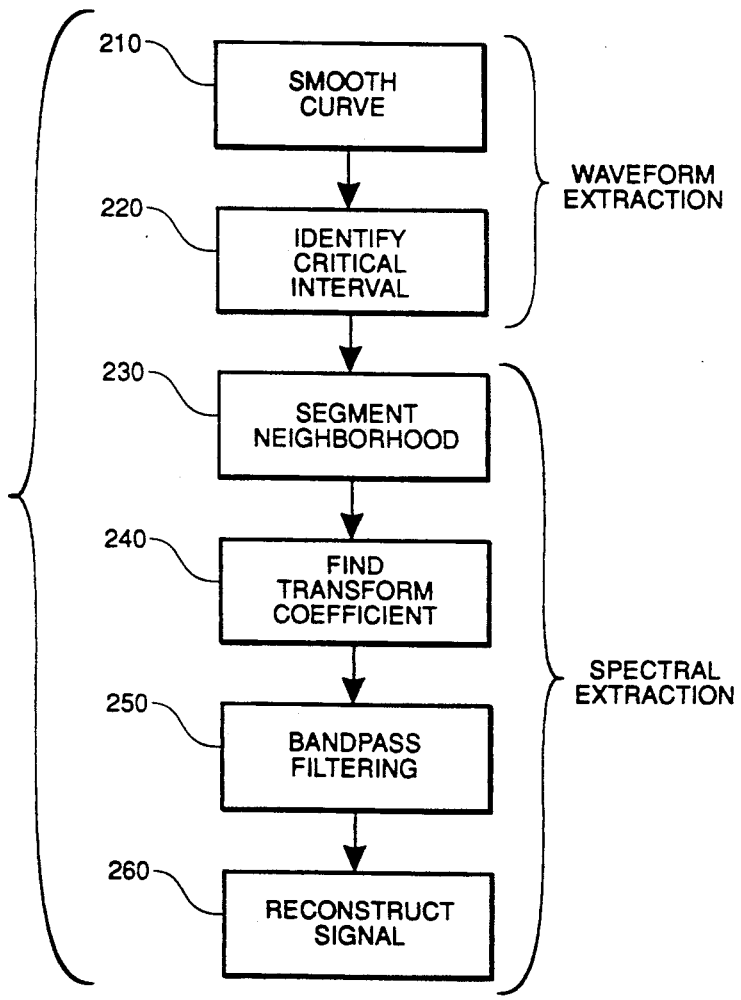
FIG. 2 is a diagram showing the steps used in a digital signal processor for discrimination of a target return from an aerosol signal.

(1) Smooth the data distribution curve (block 210 of FIG. 2).

(2) Using the waveform extraction technique, identify the critical interval which may represent the target return signal, if any (block 220 of FIG. 2).

(3) Segment the neighborhood which includes the critical interval and the aerosol return signal, if any (block 230 of FIG. 2).

(4) Find transform coefficients for the segmented interval (block 240 of FIG. 2).

(5) Apply appropriate bandpass filtering to the transform coefficients (block 250 of FIG. 2).

(6) Reconstruct a signal using the filtered transform coefficients (block 260 of FIG. 2).

Target discrimination from aerosol can be achieved by steps 1 and 2, which use the waveform extraction technique. However, the discrimination is reinforced by the spectral extraction technique used in steps 3 through 6.

Details of each of the above six steps appear in the following description. A proqram in the C-lanquaqe appears in the appendix of the report AFATL-TR-90-50 incorporated herein by reference.

1. Smoothing Data Distribution Curve

Smoothing the data distribution curve prior to application of the waveform extraction technique is essential. The efficiency of the technique depends on the smoothness of the curve. Seven-point neighborhood averaging Eq (1-1) is used for this purpose. Let $y(n)$ and $f(n)$ be the original and smoothed distributions respectively.

$$f(n) = \sum_{i=-3}^{3} y(n+1)/7 \text{ for } n = 4, 5 \ldots m-3 \quad (1\text{-}1)$$

$$f(n) = y(3) \text{ for } n = 1, 2 \text{ and } 3$$

$$f(n) = y(m-3) \text{ for } n = m-2, m-1 \text{ and } m$$

where m is the number of data points.

2. Identifying the Critical Interval

A critical interval refers to an interval which may represent the return signal from a target. This interval should exclude false signals caused by aerosol or noise.

Several parameters are used in the algorithm developed for this purpose. These are (1) the first derivatives of the smoothed data f(n), (2) the second derivative of f(n), and (3) the number of data points in the target return signal.

The following is the algorithm for identifying the critical interval using these parameters.

(1) Find the derivatives f'(n) for n in the domain. Smooth f'(n) using the 7 point neighborhood averaging formulated in eq. (1-1).

(2) Using the f'(n) distribution, find the interval [$n_r$, $n_f$] where $n_r$ is the rising point of f(n) and $n_f$ is the falling point of f(n) which follows $n_r$.

a) If $f'(n_r-1)<0$, $f'(n_r-2)<0$, $f'(n_r+1)>0$, and $f'(n_r+2)>0$, then $n_r$ is the rising point of f(n).

b) If $f'(n_f-1)>0$, $f'(n_f-2)<0$, and $f'(n_f+1)<0$, then $n_f$ is the falling point of f(n).

(3) Find a point p such that $f'(p)=\max\{f'\}$ for every n in the interval [$n_r$, $n_f$]. If $f'(p)>C_p$ for a given positive number $C_p$, then proceed to the next step.

(4) Find f''(n) for every n in the interval [$n_r$, $n_f$]. Find h such that $f''(h)=\{\max(f''(n))\}$ for every n in the interval [$n_r$, p]. Also find l such that $f''(l)=\min\{f''(n)\}$ for every n in the interval [p, $n_f$]. If $f''(h)>C_h$ and $f''(l)<C_l$ for a given positive number $C_h$ and a given negative number $C_l$, then proceed to the next step.

(5) Let t be the number of data points for a target return and w be the number of data points in the interval [$n_r$, $n_f$]. If $|w-t|<d$ for a small number d, then claim that [$n_r$, $n_f$] is the critical interval.

Repeat steps 2 through 5 until the critical interval is identified.

Adaptive Thresholding for Parameters

The variety of distribution curves of experimental data sets requires adaptive threshold setting for parameters. When the density of aerosol is high, the intensity of the target return signal deteriorates. This may cause the failure of the recognition of the target return when it exists. To avoid this, an attempt is made to adapt the threshold values of the parameters $C_p$ in step 3 and $C_p$ and $C_l$ in step 4 to such a situation. The following describes this scheme.

If an interval [$n_r$, $n_f$] satisfies the first derivative test stated in step 3, then this interval represents an aerosol return signal or a target return signal. If the interval does not satisfy the second derivative test stated in step 4 or the width test in step 5, then the interval can not be a target return signal. Consequently it represents an aerosol return signal. Name this interval [$a_r$, $a_f$]. The new interval which occurs following [$a_r$, $a_f$] should be tested for f'(p), f''(h), and f''(l) with reduced threshold values for $C_p$, $C_h$ and $C_l$ respectively. If the interval [$n_r$, $n_f$] satisfies the first derivative test, the second derivative test, and the width test for each reduced parameter value, then [$n_r$, $n_f$] is claimed as a critical interval.

3. Segmentation

The effectiveness of a spectral selection technique depends on the adequate segmentation of the interval for which the orthogonal transformation is to be performed. For the technique to be effective, it should not overlook any existing target return or give any false alarm when a target return does not exist.

It is observed that an adequate segmentation is based on the following criteria:

(1) The segmented interval should exclude all the noise elements that precede or follow the aerosol and target returns.

(2) Let $n_s$ and $n_e$ be the first and the last data points of the segmented interval respectively. Let $$\text{delta} = f(n_s) - f(n_e) \tag{3-1}$$

The ringing effects, which distort the reconstructed signal, become more pronounced for a larger delta in Eq. (3.1). It is necessary to select $n_s$ and $n_e$ which make delta small.

The algorithm described below is based on these observations. The algorithm is made adaptive to two different conditions, aerosol and clear air. Three different cases are examined for each condition.

3.1 Aerosol Condition

To make delta in Eq. (3.1) small, $f(n_s)$ and $f(n_e)$ are balanced using $f(n_r)$ as a pivot where $n_r$ is the rising point of a possible target return. Three different cases are considered as follows.

Let $n_p$ be the rising point of an interval with the following two conditions: (1) the interval has passed the first derivative test mentioned in step 3 of Section 2, and (2) the interval immediately precedes $n_r$. In other words, $n_p$ is the starting point of the aerosol return which precedes a possible target return. Three cases exist:

$$f(n_s) < f(n_e)$$

$$f(n_s) > f(n_e)$$

or $$f(n_s) = f(n_e)$$

Similarly let $n_a$ be the rising point of $f(n)$ immediately following $n_r$. Then $$f(n_p) < f(n_r)$$

$$f(n_p) > f(n_r)$$

or $$f(n_p) = f(n_r)$$

However, in all the data sets taken, only the first case occurred for $n_a$. Therefore, three cases are considered in the algorithm.

Case 1. $f(n_p) < f(n_r)$ and $f(n_a) < f(n_r)$

Since $f(n_p) < f(n_r)$ and $f(n_a) < f(n_r)$, there exists a point A in the interval $[n_p, n_r]$ such that $$f(A+1) > f(n_r)$$

and $$f(B) \leq f(n_r) \tag{3-2}$$

Similarly, since $f(n_a) < f(n_r)$ and $n_a > n_r$, there exists a point B in the interval $[n_r, n_a]$ such that $$f(B) \leq f(n_r)$$

and $$f(B-1) > f(n_r) \tag{3-3}$$

Let $$n_s = A$$

and $$n_e = B \tag{3-4}$$

Thus the interval [A, B] is the segmentation interval $[n_n, n_e]$ Case 2. $f(n_p) > f(n_r)$ and $f(n_a) < f(n_r)$ In this case, the most effective way to find a small delta in Eq (3-1) is to formulate another function $q(n)$ to replace $f(n)$ for a certain interval. Let $$q(n) = n - n_p + f(n_p) \tag{3-5}$$

Eq. (3-5) is an equation of a line with a slope of one and passing through the point $(n_p, f(n_p))$ Let $$h(n) = f(n_r) \tag{3-6}$$

Then $h(n)$ is a horizontal line passing through the point $(n_r, f(n_r))$. To find the intersection of $q(n)$ and $h(n)$, Let $$f(n_r) = n - n_p + f(n_p) \tag{3-7}$$

or $$n = f(n_r) + n_p + f(n_p)$$

Replace $f(n)$ by $q(n)$ for the interval $[f(n_r) + n_p + f(n_p), n_p]$ and let $$n_s = f(n_r) + n_p - f(n_p) \tag{3-8}$$

and where B is defined in Eq. (3-4). The interval $[n_n, n_e]$ is the segmentation interval.

3.2 Clear Air Condition

In the clear air condition, the target return signal shows a sharper rising slope, whereas in the aerosol condition the slope diminishes more and more as the density of aerosol increases. However, the larger the data size is, the more the chances are that the signal to noise ratio will decrease. Therefore, segmentation prior to applying the spectral extraction technique is necessary even in the clear condition.

The algorithm used for segmentation in this case is similar to the one described in Section 3.1. The only difference is in the definition of the point $n_p$ which was defined in the previous section as the rising point of the aerosol return immediately preceding the possible target return. Since an aerosol return does not exist in this case, the point $n_p$ is defined simply as the rising point of the data function $f(n)$ preceding the possible target return. The rest of the processes in the algorithm are the same as described in Section 3.1.

4. Bandpass Filtering

4.1 Transform

After the smoothed data distribution $f(n)$ (Sec 1) is segmented for the interval $[n_n, n_e]$, the transform coefficients $F(u)$ of $f(n)$ for the interval $[0, m = n_e - n_s]$ are to be found. The DFT is used for the orthogonal basis function.

4.2 Bandpass Filter

After weighing trade-offs in terms of computational cost versus performance, trapezoidal filters were selected for use in bandpass filtering the transform coefficients of the segmented data sets. The filter operation and the filter formulation follow.

Let T(u) be the trapezoidal bandpass filter function and F(u) the transform coefficients of the segmented data function f(n). G(u), the bandpassed frequency, is defined as $$G(u) = T(u) \times f(u) \text{ for } u = 0, 1, 2, \ldots, m \quad (4\text{-}1)$$

where $m = n_e - n_s$.

Figure 2A:
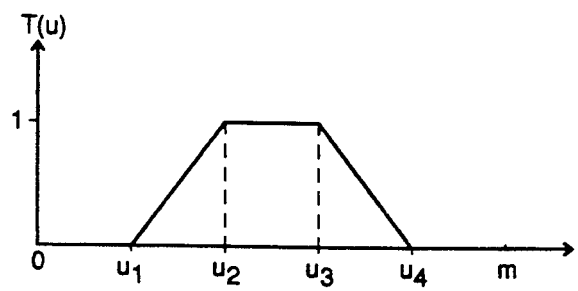
FIG. 2a is a graph of a trapezoidal bandpass filter.

The filter function T(u) is formulated as shown in FIG. 2a. where $$\begin{aligned}
u_1 &= m/20 \\
u_2 &= u_1 + m/10 \\
u_3 &= m - u_2 \cdot m/100 \text{ and} \\
u_4 &= m - u_1 \cdot m/100
\end{aligned} \quad (4\text{-}2)$$

$$T(u) = \begin{cases} f(u) \cdot (u - u_1)/(u_2 - u_1) & \text{if } u_1 < u < u_2 \\ f(u) & \text{if } u_2 < u < u_3 \\ f(u) \cdot (u_4 - u)/(u_4 - u_3) & \text{if } u_3 < u < u_4 \\ 0 & \text{elsewhere} \end{cases}$$

As Eq. (4-2) shows, the bandpass filter function is adapted to the size of each segmented data set.

4.3 Signal Reconstruction

The bandpass filtered signal g(n) is reconstructed by performing the inverse transform of G(u) of Eq. (4-1).

5. Enhancement

The reconstructed signal g(n) shows the target interval by the different intensities of g(n) which are higher in the interval than any other interval in the domain. However, g(n) is somewhat distorted due to ringing effects or some high frequency aerosol components. To enhance this point the following technique is used.

(1) Set $g(n) = 0$ if $g(n) < 0$ for every n in $[n_n, n_e]$.
(2) Compute the average value av of g(n) for every n in $[n_n, n_e]$.
(3) Find $A(n) = g(n) - av$ for every n in $[n_s, n_e]$.
(4) Set $A(n) = 0$ if $A(n) < 0$ for every n in $[n_s, n_e]$.
(5) Compute V(n) such that $V(n) = A(n) \times A(n)$ for every n in $[n_s, n_e]$.

V[n] represents the wave form of the target signal separated from that of an aerosol return. This wave form is somewhat modified from the original target wave form while going through the processes described in Sections 4 and 5.

6. Illustrations

The results obtained in each process of the algorithm described above are illustrated in the drawings.

Figure 3A:
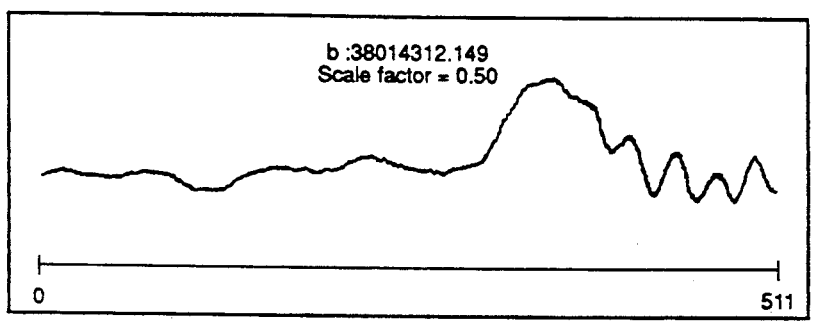
FIGS. 3a–12b are graphs illustrating the signals in the system using the steps of FIG. 2.
Figure 3B:
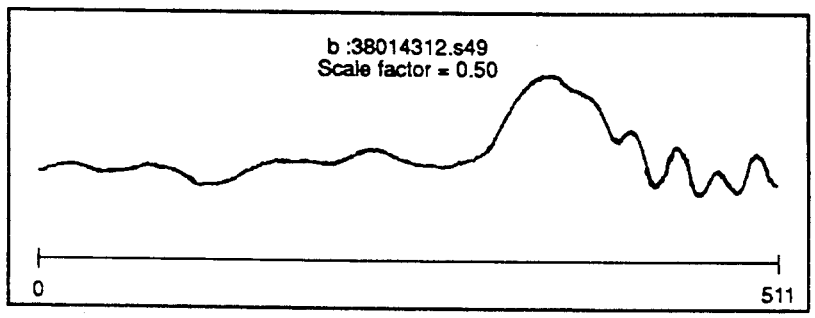

FIGS. 3a and b illustrate the results of applying 7-point neighborhood averaging described in Section 1, with the original data in FIG. 3a and smoothed data in FIG. 3b.

Figure 4A:
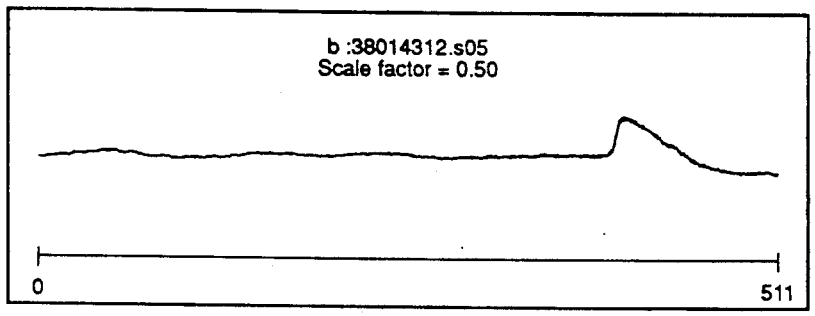
Figure 4B:
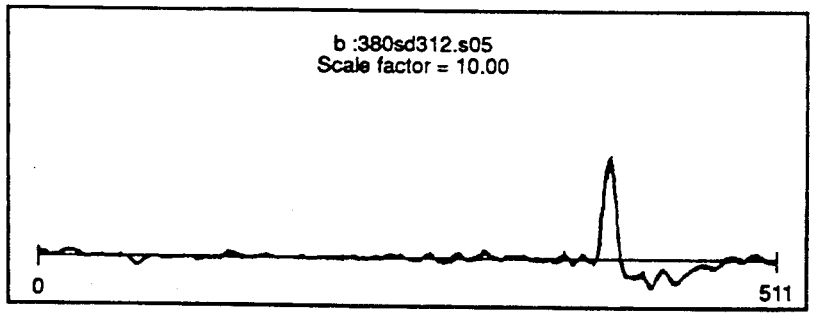
Figure 4C:
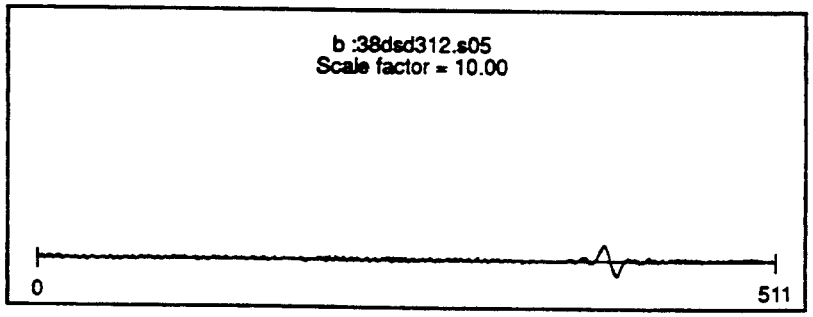
Figure 5A:
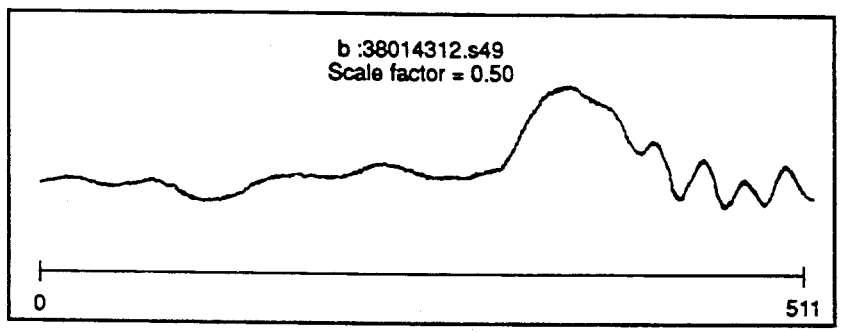
Figure 5B:
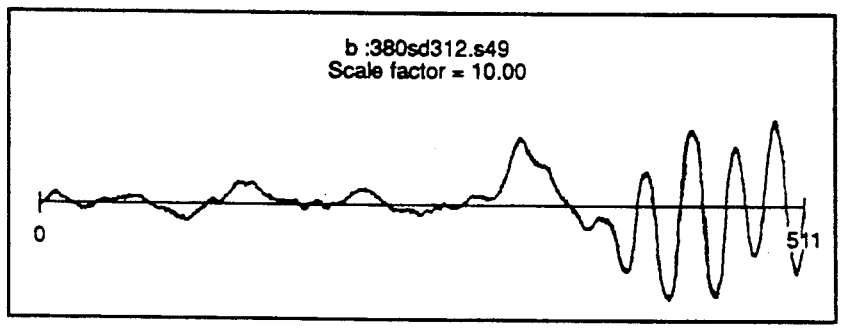
Figure 5C:
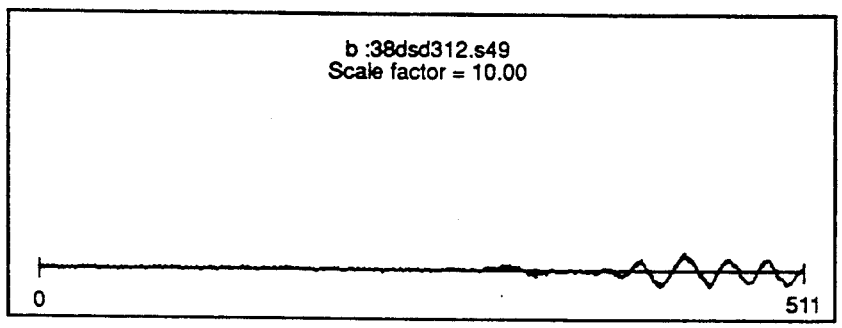

FIGS. 4a-5c illustrate distributions (#1 in FIGS. 4a-4c and #2 in FIGS. 5a-5c) for the data (smoothed) in FIGS. 4a and 5a, the first derivative (smoothed) in FIGS. 4b and 5b, and the second derivative in FIGS. 4c and 5c.

Figure 6A:
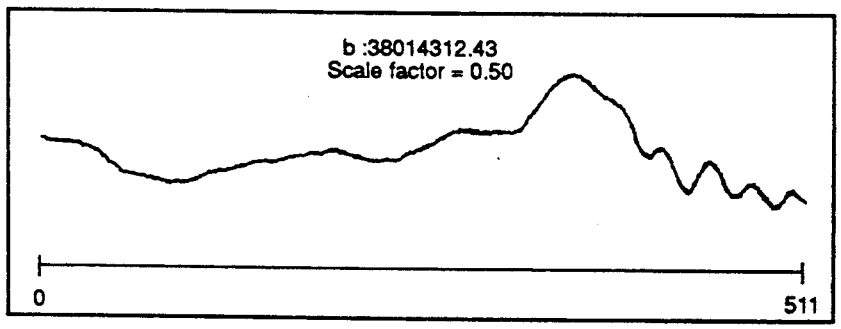
Figure 6B:
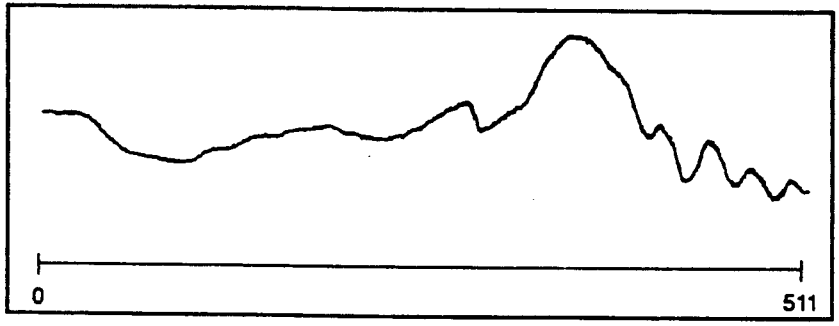

FIGS. 6a-b and 7a-b illustrate the techniques described in case 2 of Section 3.1 and 3.2 respectively. FIGS. 6a-b illustrate balancing end points of segmentation interval (#1), (6a) data with aerosol(smoothed), (6b) interpolated data by g(n) of Eq. (3-5).

Figure 7A:
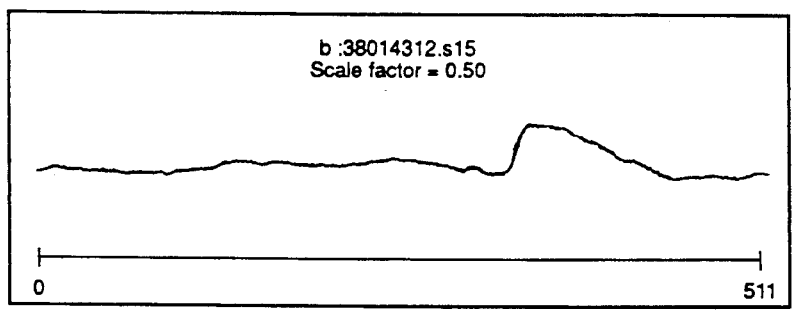
Figure 7B:
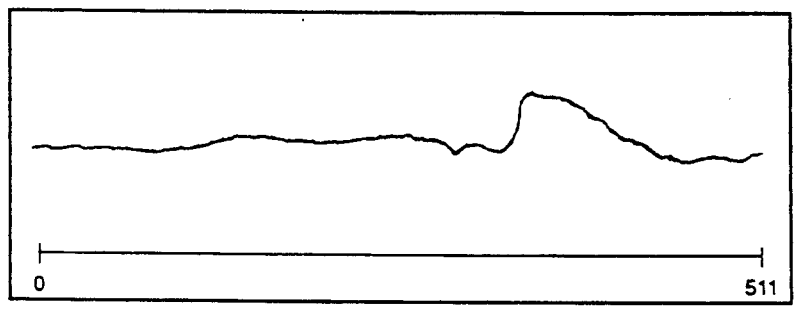

FIGS. 7a-b illustrate balancing end points of segmentation interval (#2), (7a) data without aerosol(smoothed), (6b) interpolated data by g(n) of Eq. (3-5).

Figure 8A:
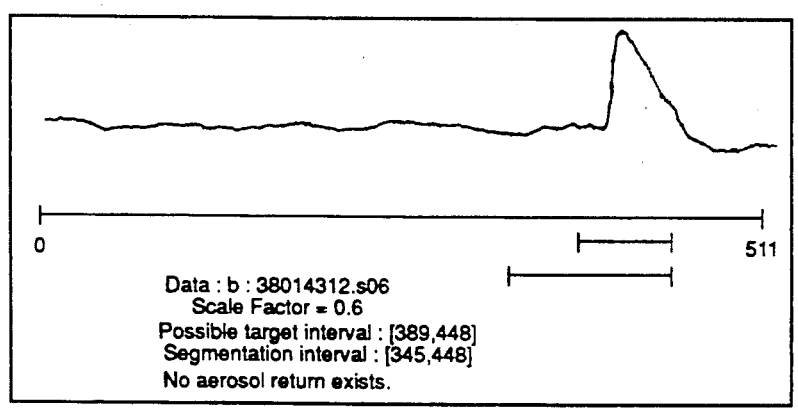
Figure 8B:
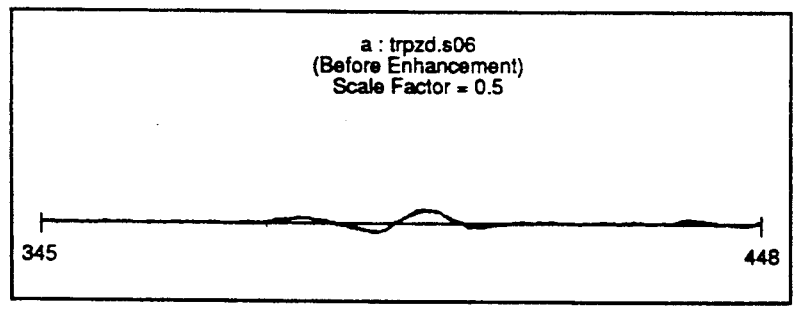
Figure 8C:
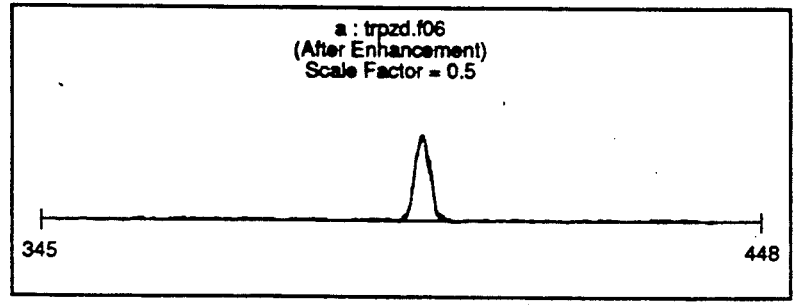
Figure 9A:
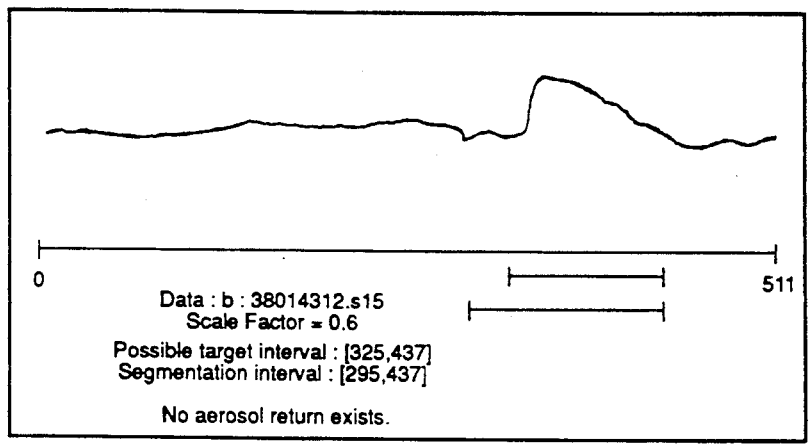
Figure 9B:
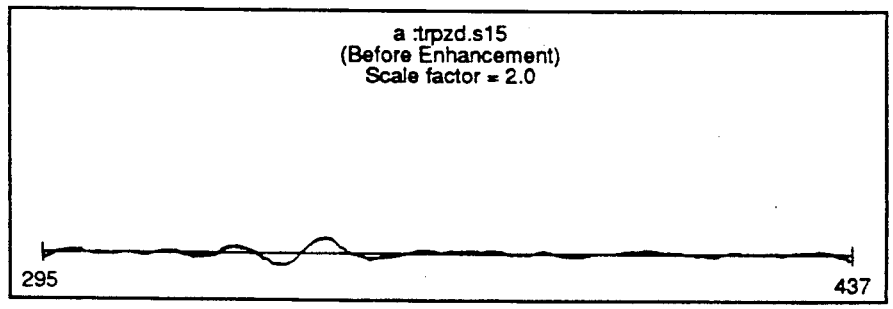
Figure 9C:
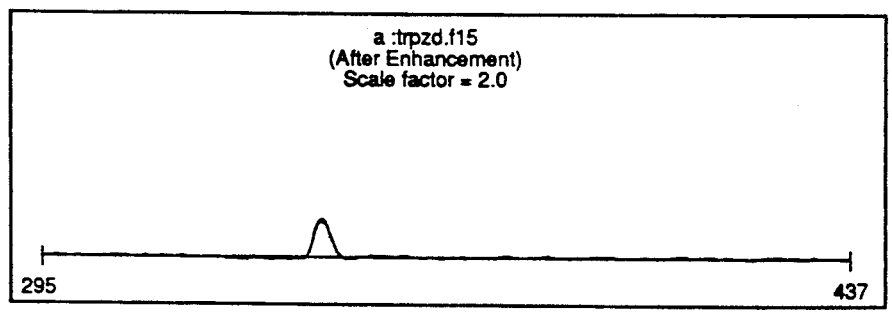
Figure 10A:
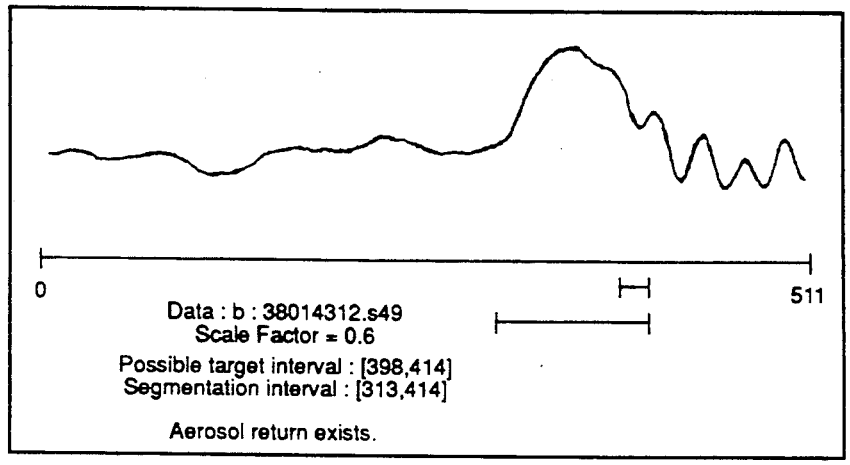
Figure 10B:
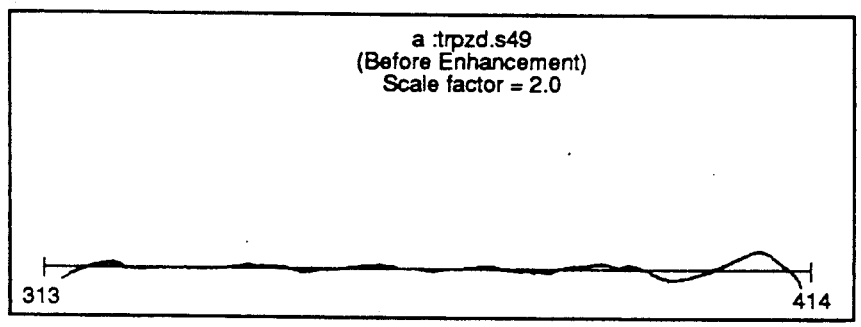
Figure 10C:
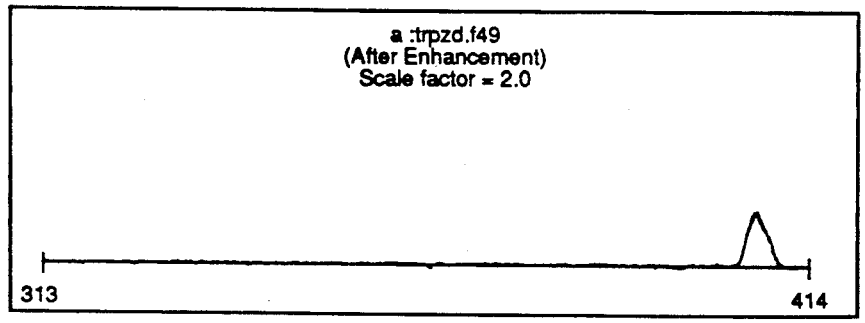
Figure 11A:
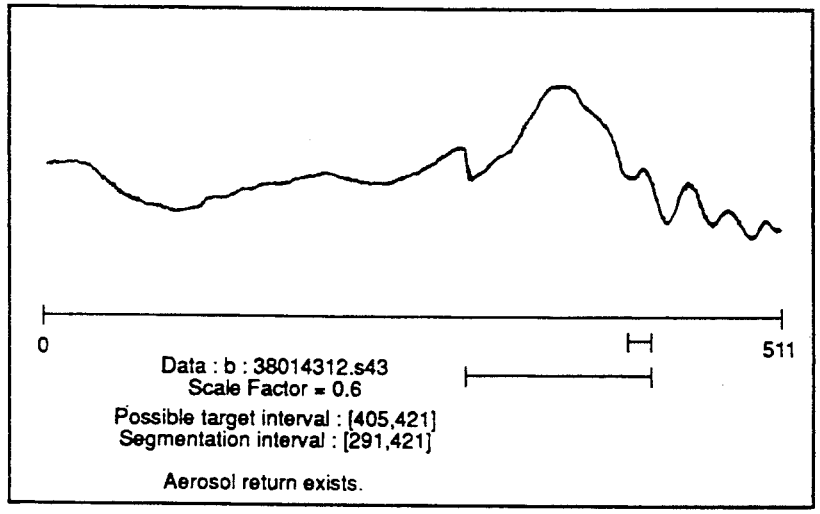
Figure 11B:
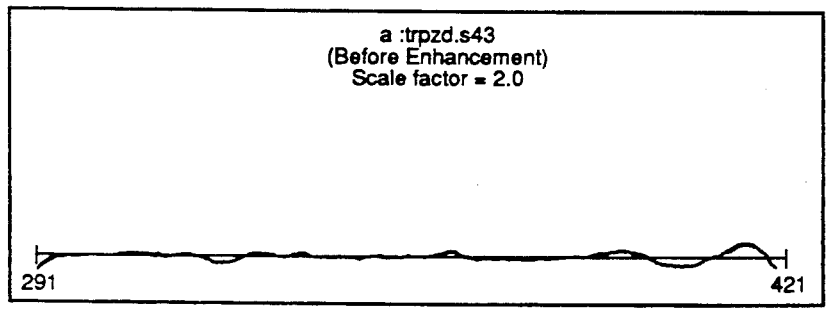
Figure 11C:
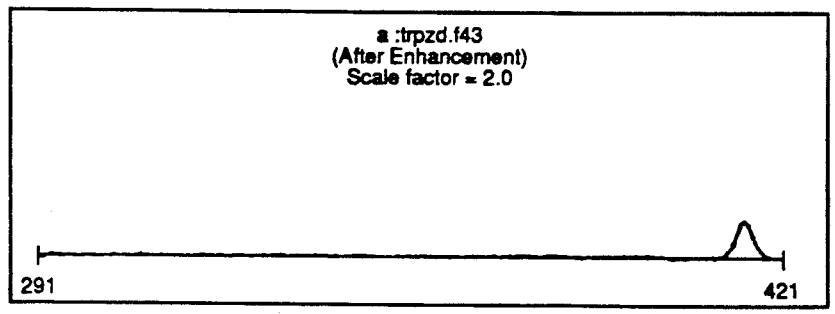

FIGS. 8a-11c show the target signal separated, #1 in FIGS. 8a-c, #2 in FIGS. 9a-c, #3 in FIGS. 10a-c, and #4 in FIGS. 11a-c.

FIGS. 8a, 9a, 10a and 11a are the illustrations of the segmented intervals (extraction of segmentation interval.

FIGS. 8b, 9b, 10b and 11b illustrate the signals reconstructed from the band pass filtered transform coefficients. The related algorithm is described in Section 4.

FIGS. 8c, 9c, 10c and 11c illustrate the results of applying the enhancement process described in Section 5 to the signals of FIGS. 8b, 9b, 10b and 11b respectively.

Figure 12A:
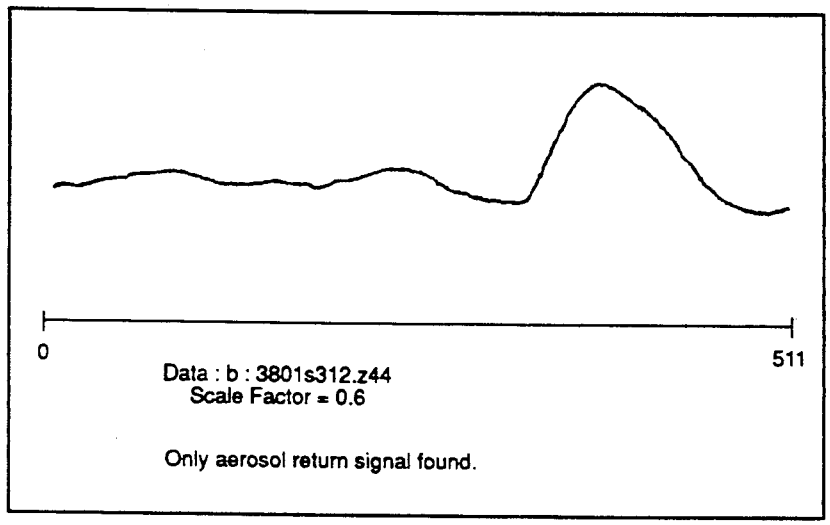
Figure 12B:
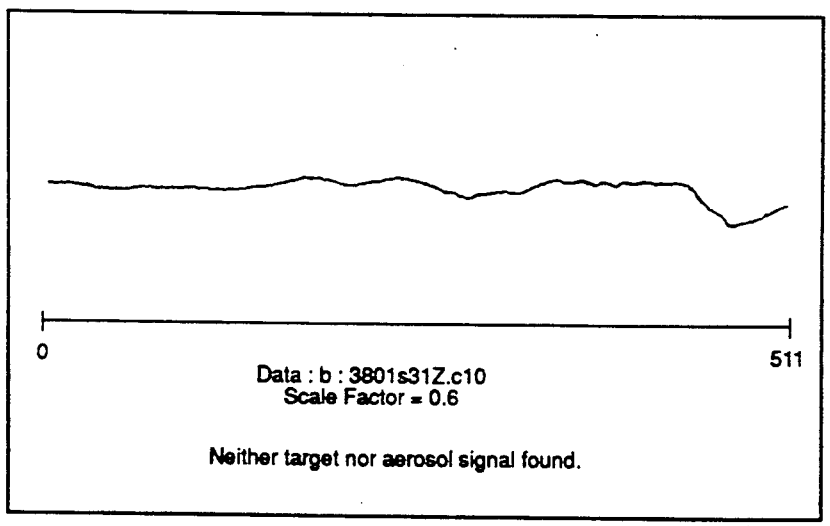

FIGS. 12a-12c illustrate the results of processing data which do not have a target return signal (FIG. 12a, aerosol condition, FIG. 12b, clear air condition).

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A light detecting and ranging pulse signal processor for receiving and processing a plurality of return pulses transmitted from a laser transmitter for target-aerosol discrimination with a target at a short range of less than 30 meters by means of digital signal processing; said system comprising:

a receiver comprised of a detector for detecting each pulse, to provide data with each pulse representing a data point having an analog value;

analog-to-digital conversion means coupled to the detector to convert the analog value of each data point to a digital value;

a digital signal processor coupled to the analog-to-digital conversion means, with the data being organized into sets of a given number of data points forming a data distribution curve;

wherein the digital signal processor comprises first and second means using a wave waveform extraction technique; and third, fourth, fifth and sixth means using a spectral extraction technique on one of said sets at a time; wherein said first means comprises means for smoothing the data distribution curve;

said second means comprises means for identifying the critical interval which may represent a target return signal, if any, using first and second derivatives and the number of data points in the target return signal;

said third means comprises means for segmenting a neighborhood which includes a critical interval and an aerosol return signal, if any;

said fourth means comprises means for finding transform coefficients for the segmented interval;

said fifth means comprises means for applying appropriate bandpass filtering to the transform coefficients; and said sixth means comprises means for reconstructing a signal using the filtered transform coefficients.

2. A method used in a light detecting and ranging pulse signal processor for receiving and processing a plurality of return pulses transmitted from a laser transmitter for target-aerosol discrimination with a target at a short range of less than 30 meters by means of digital signal processing; said method comprising:

receiving and detecting each pulse, to provide data with each pulse representing a data point having an analog value;

converting the analog value of each data point to digital value, with the data organized into sets of a given number of data points forming a data distribution curve;

using a digital signal processor with first and second steps using a wave waveform extraction technique; and third, fourth, fifth and sixth steps using a spectral extraction technique on one of said sets at a time; wherein said first step comprises smoothing the data distribution curve;

said second step comprises identifying the critical interval which may represent a target return signal, if any, using first and second derivatives and the number of data points in the target return signal;

said third step comprises means segmenting a neighborhood which includes a critical interval and an aerosol return signal, if any;

said fourth step comprises finding transform coefficients for the segmented interval;

said fifth step comprises applying appropriate bandpass filtering to the transform coefficients; and said sixth step comprises reconstructing a signal using the filtered transform coefficients.

3. The method according to claim 2, wherein said second step comprises:

(2-1) finding the derivatives f'(n) for n in the domain, and smoothing f'(n);

(2-2) using the f'(n) distribution, finding the interval $[n_r, n_f]$ where $n_r$ is the rising point of f(n) and $n_f$ is the falling point of f(n) which follows $n_r$;

a) if $f'(n_r-1)<0$, $f'(n_r-2)<0$, $f'(n_r+1)>0$, and $f'(n_r+2)>0$, then $n_r$ is the rising point of f(n);

b) if $f'(n_f-1)>f'(n_f-2)<0$, and $f'(n_f+1)<0$, the $n_f$ is the falling point of f(n);

(2-3) finding a point p such that $f'(p)=\max\{f'(n)\}$ for every n in the interval $[n_r, n_f]$, if $f'(p)>C_p$ for a given positive number $C_p$, then proceeding to the next step;

(2-4) finding f''(n) for every n in the interval $[n_r, n_f]$, finding h such that $f''(h)=\max\{f''(n)\}$ for every n in the interval $[n_r, p]$, also finding l such that $f''(l)=\min\{(f''(n))\}$ for every n in the interval $[p, n_f]$, if $f''(h)>C_h$ and $f''(l)<C_l$ for a given positive number $C_h$ and a given negative number $C_l$, then proceeding to the next step;

(2-5) let t be the number of data points for a target return and w be the number of data points in the interval $[n_r, n_f]$, if $|w-t|<d$ for a small number d, then claiming the $[n_r, n_f]$ is the critical interval; and repeating steps (2-2) through (2-5) until the critical interval is identified.

4. The method according to claim 3, wherein said second step further comprises:

adapting the threshold values of the parameters $C_p$ in step (2-3) and $C_p$ and $C_l$ in step (2-4) for a high density of aerosol as follows:

if an interval $[n_r, n_f]$ satisfies the first derivative test stated in step (2-3), then this interval represents an aerosol return signal or a target return signal, if the interval does not satisfy the second derivative test stated in step (2-4) or the width test in step (2-5), then the interval cannot be a target return signal, consequently it represents an aerosol return signal, name this interval $[a_r, a_f]$, testing the new interval which occurs following $[a_r, a_f]$ for f'(p), f''(h), and f''(l) with reduced threshold values for $C_p$, $C_h$ and $C_l$ respectively; if the interval $[n_r, n_f]$ satisfies the first derivative test, the second derivative test, and the width test for each reduced parameter value, then $[n_r, n_f]$ claiming as a critical interval.

5. The method according to claim 3, wherein said third step comprises:

wherein segmentation is based on the following criteria:

(1) the segmented interval should exclude all the noise elements that precede or follow the aerosol and target returns;

(2) let $n_s$ and $n_e$ be the first and the last data points of the segmented interval respectively, let $$\text{delta} = f(n_s) - f(n_e) \quad (3.1)$$

selecting $n_s$ and $n_e$ which make delta small;

wherein for an aerosol condition, to make delta small, $f(n_s)$ and $f(n_e)$ are balanced using $f(n_r)$ as a pivot where $n_r$ is the rising point of a possible target return, let $n_p$ be the rising point of an interval with the following two conditions: (1) the interval has passed the first derivative test mentioned in step (2-3), and (2) the interval immediately precedes $n_r$, (in other words, $n_p$ is the starting point of the aerosol return which precedes a possible target return); for a first case, $f(n_p) < f(n_r)$ and $f(n_a) < f(n_r)$ since $f(n_p) < f(n_r)$ and $f(n_a) < f(n_r)$, there exists a point A in the interval $[n_p, n_r]$ such that $$f(A+1) > f(n_r)$$

and $$f(B) \leq f(n_r) \quad (3-2)$$

similarly, since $f(n_a) > f(n_r)$ and $n_a \leq n_r$, there exists a point B in the interval $[n_r, n_a]$ such that $$f(B) \leq f(n_r)$$

and $$f(B-1) > f(n_r) \quad (3-3)$$

let $$n_s = A$$

and $$n_e = B \quad (3-4)$$

thus the interval [A, B] is the segmentation interval $[n_s, n_e]$; for a second case, $f(n_p) > f(n_r)$ and $f(n_a) < f(n_r)$, to find a small delta in Eq. (3-1), formulate another function q(n) to replace f(n) for a certain interval; let ps $$q(n) = n - n_p + f(n_p) \quad (3-5)$$

let $$h(n) = f(n_r). \quad (3\text{-}6)$$

to find the intersection of q(n) and h(n), let $$f(n_f) = n - n_p - f(n_p) \quad (3\text{-}7)$$

or $$n = f(n_r) - n_p - f(n_p).$$

replace f(n) by q(n) for the interval $[f(n_r)+n_p+f(n_p), n_p]$ and let $$n_s = f(n_r) + n_p - f(n_p)$$

(3-8)

and $$n_e = B$$

where B is defined in Ed. (3-4); so that the interval $[N_s, n_e]$ is the segmentation interval; and wherein for a clear condition, the target return signal shows a sharper rising slope, the point $n_p$ is defined simply as the rising point of the data function f(n) preceding the possible target return, and the rest oft the processes are the same as for an aerosol condition.

6. The method according to claim 5, wherein said fourth step comprises:

after the smoothed data distribution f(n) is segmented for the interval $[n_s, n_e]$, finding the transform coefficients F(u) of f(n) for the interval $[0, m=n_e-n_s]$;

wherein said fifth step comprises:

using a trapezoidal filter bandpass filtering the transform coefficients of the segmented data sets, the filter operation and the filter formulation being as follows, let T(u) be the trapezoidal bandpass filter function and F(u) the transform coefficient of the segmented data function f(n); G(u), the bandpass frequency, being defined as $$G(u) = T(u) \times f(u) \text{ for } u = 0, 1, 2, \ldots, m \quad (4\text{-}1)$$

ps where $m = n_e - n_s$;

the filter function T(u) is formulated where $$\begin{aligned}
u_1 &= m/20 \\
u_2 &= u_1 + m/10 \\
u_3 &= m - u_2 * m/100 \text{ and} \\
u_4 &= m - u_1 * m/100
\end{aligned} \quad (4\text{-}2)$$

$$T(u) = \begin{cases} f(u) * (u - u_1)/(u_2 - u_1) & \text{if } u_1 < u < u_2 \\ f(u) & \text{if } u_2 < u < u_3 \\ f(u) * (u_4 - u)/(u_4 - u_3) & \text{if } u_3 < u < u_4 \\ 0 & \text{elsewhere} \end{cases}$$

whereby the bandpass filter function is adapted to the size of each segmented data set;

and wherein said fifth step comprises:

reconstructing the bandpass filtered signal gy(n) by performing the inverse transform of G(u) of Eq. (4-1).

* * * * *

UNITED STATES PATENT AND TRADEMARK OFFICE
CERTIFICATE OF CORRECTION

PATENT NO. : 5,102,218
DATED : April 7, 1992
INVENTOR(S) : Kwang S. Min et al

It is certified that error appears in the above-identified patent and that said Letters Patent is hereby corrected as shown below:

Column 1, line 15, "Particular" should not be capitalized.

Column 3, line 44, "proqram" should be --program--.

Column 3, line 44, "lanquaqe" should be --language--.

Column 3, line 57, "(n+1)" should be --(n+i)--.

Column 4, line 20, "max{f'}" should be --max{f'(n)}--.

Column 5, line 7, "$f(n_s)-f(n_e)$" should be --$|f(n_s)-f(n_e)|$--.

Column 6, line 1, "$n_s-A$" should be --$n_s=A$--.

Column 6, line 6, "$n_n$" should be --$n_s$--.

Column 6, line 7, a period should follow "$n_e$]".

Column 6, line 15, a period should follow "$f(n_p)$)".

Column 6, line 33, --$n_e=B$-- should appear below "and".

Column 6, line 34, "$n_n$" should be --$n_s$--.

Column 6, line 59, "$n_n$" should be --$n_s$--.

Column 7, line 38, "$n_n$" should be --$n_s$--.

Column 7, line 40, "$n_n$" should be --$n_s$--.

Column 9, line 39, "$f'n_r+1)$" should be --$f'(n_r+1)$--.

Column 9, line 41, --0,-- should follow ">".

Column 9, line 50, "{(f"(n))}" should be --{f"(n)}--.

Column 9, line 57, the first "the" should be --that--.

Column 10, line 21, "$f(n_s)-f(n_e)$" should be --$|f(n_s)-f(n_e)|$--.

Column 10, line 44, ">" should be --<--.

Column 10, line 44, "$\leq$" should be -->--.

UNITED STATES PATENT AND TRADEMARK OFFICE
CERTIFICATE OF CORRECTION

PATENT NO. : 5,102,218
DATED : April 7, 1992
INVENTOR(S) : Kwang S. Min et al

It is certified that error appears in the above-identified patent and that said Letters Patent is hereby corrected as shown below:

Column 10, line 64, "ps" should be deleted.

Column 11, line 5, "$f(n_f)$" should be --$f(n_r)$--.

Column 11, line 15, "(3-8)" should be to the right of the preceding equation to denote the equation number.

Column 11, line 20, "Ed." should be --Eq.--.

Column 11, line 20, "$[N_S$" should be --$[n_S$--.

Column 11, line 22, --air-- should follow "clear".

Column 11, line 26, "oft" should be --of--.

Column 12, line 7, "coefficient" should be --coefficient--.

Column 12, line 8, "bandpass" should be --bandpassed--.

Column 12, line 11, "(4-1)" should be farther to the right to denote the equation number.

Column 12, line 12, "ps" should be deleted.

Column 12, line 29, "gy(n)" should be --g(n)--.

Signed and Sealed this

Seventh Day of September, 1993

*Attest:*

BRUCE LEHMAN

*Attesting Officer*  *Commissioner of Patents and Trademarks*